(12) United States Patent
Barton

(10) Patent No.: US 9,470,901 B2
(45) Date of Patent: Oct. 18, 2016

(54) VIEWING APPARATUS WITH INTEGRATED POLARIZED LENS

(75) Inventor: Spencer Reg Barton, Chapel Hill (AU)

(73) Assignee: BYFIELD OPTICS PTY LTD, Chapel Hill, Queensland (AU)

( * ) Notice: Subject to any disclaimer, the term of this patent is extended or adjusted under 35 U.S.C. 154(b) by 133 days.

(21) Appl. No.: 14/233,221

(22) PCT Filed: Jun. 29, 2012

(86) PCT No.: PCT/AU2012/000770

§ 371 (c)(1),
(2), (4) Date: May 19, 2014

(87) PCT Pub. No.: WO2013/010208

PCT Pub. Date: Jan. 24, 2013

(65) Prior Publication Data

US 2014/0247485 A1   Sep. 4, 2014

(30) Foreign Application Priority Data

Jul. 19, 2011  (AU) ................................ 2011902854

(51) Int. Cl.
  *G02B 7/02*   (2006.01)
  *G02B 27/28*  (2006.01)
  (Continued)

(52) U.S. Cl.
  CPC ............... *G02B 27/281* (2013.01); *G02B 5/30* (2013.01); *G02B 7/003* (2013.01); *G02B 23/18* (2013.01); *G02B 27/28* (2013.01); *G02B 7/06* (2013.01)

(58) Field of Classification Search
  CPC ...... G02B 5/30; G02B 5/3025; G02B 7/003; G02B 7/006; G02B 7/02; G02B 7/022; G02B 7/06; G02B 23/00; G02B 23/02; G02B 23/18; G02B 27/28; G02B 27/281; G02B 27/286

USPC ........................ 359/407–418, 465, 480–482, 359/483.01–493.01, 677, 738, 808, 819, 359/835

See application file for complete search history.

(56) References Cited

U.S. PATENT DOCUMENTS 2,383,186 A   8/1945   Glasser
3,528,724 A   9/1970   Berlin
(Continued)

FOREIGN PATENT DOCUMENTS

CN   2629054 Y   7/2004
CN   2650702 Y   10/2004
(Continued)

OTHER PUBLICATIONS

Chinese Office Action issued in corresponding Chinese Patent Application No. 201280035622.7 mailed Jun. 30, 2015.
(Continued)

*Primary Examiner* — Derek S Chapel
(74) *Attorney, Agent, or Firm* — Davis & Bujold PLLC; Michael J. Bujold

(57) ABSTRACT

The current invention is directed to a pair of binoculars having an eyepiece with one or more ocular lenses and a view port, a polarized lens orientated and positioned on a mounting frame, one or more prisms and an objective lens; wherein the polarized lens is fixed between the eyepiece and the one or more prisms and is shaped to provide an optically correct image and orientated in the vertical plane to substantially filter refracted horizontal light. The invention has application with hunting or sporting scopes and periscopes and other types of viewing apparatus.

11 Claims, 6 Drawing Sheets

(51) Int. Cl.
*G02B 23/18* (2006.01)
*G02B 5/30* (2006.01)
*G02B 7/00* (2006.01)
*G02B 7/06* (2006.01)

(56) References Cited

U.S. PATENT DOCUMENTS

| | | | |
|---|---|---|---|
| 5,052,791 A * | 10/1991 | Kikuchi | G02B 5/3016 |
| | | | 349/200 |
| 5,264,916 A | 11/1993 | Bushman | |
| 5,305,141 A | 4/1994 | Hotta | |
| 5,404,225 A | 4/1995 | Bushman | |
| 6,546,208 B1 | 4/2003 | Costales | |
| 8,259,401 B2 * | 9/2012 | Schmieder | G02B 7/022 |
| | | | 359/811 |
| 2001/0005281 A1 | 6/2001 | Yu | |
| 2006/0164724 A1 | 7/2006 | Nagata et al. | |
| 2007/0064307 A1 | 3/2007 | Hluchan et al. | |
| 2011/0213664 A1 * | 9/2011 | Osterhout | G02B 27/017 |
| | | | 705/14.58 |

FOREIGN PATENT DOCUMENTS

| | | |
|---|---|---|
| CN | 1564049 A | 1/2005 |
| WO | 01/06282 | 1/2001 |
| WO | 02071144 A1 | 9/2002 |

OTHER PUBLICATIONS

Extended European Search Report issued in corresponding European Patent Application No. 12814881.4 mailed Jan. 30, 2015.

* cited by examiner

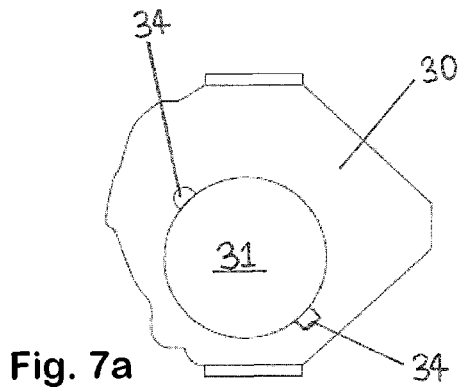
Fig. 7a
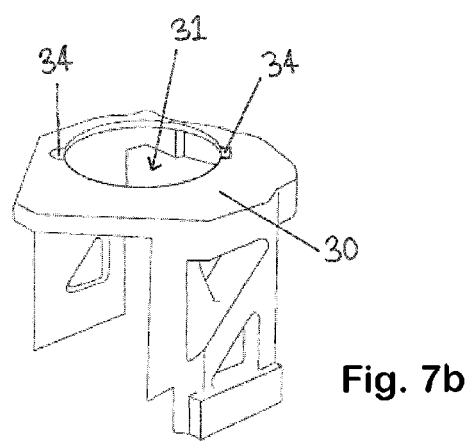
Fig. 7b
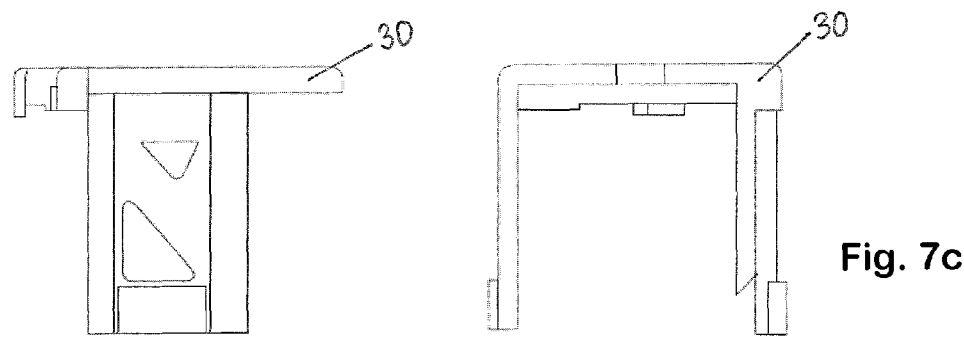
Fig. 7c
Fig. 7c
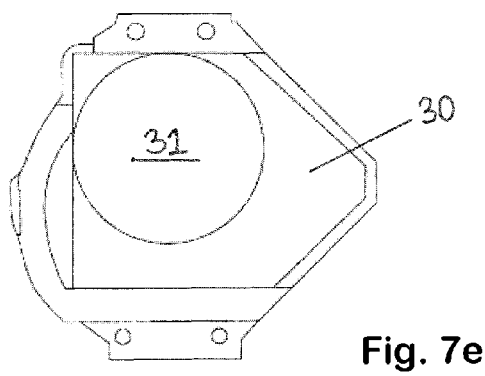
Fig. 7e

VIEWING APPARATUS WITH INTEGRATED POLARIZED LENS

FIELD OF INVENTION

The present invention relates to the field of viewing apparatus.

The present invention has particular but not exclusive application to binoculars, hunting and sporting scopes, telescopes, rifle scopes, microscopes, periscopes and kaleidoscopes.

BACKGROUND OF THE INVENTION

A light wave falling on a surface is reflected in more than one plane, namely, horizontal, vertical, or diagonal, resulting in non-polarized light waves. When a viewer views a surface from which non-polarized light wave is being reflected, the non-polarized light wave strikes the viewer's eyes intensely and creates glare. Surface reflections and glare are typically encountered on water and other shiny surfaces. In order to minimize or eliminate glare and hence enable proper viewing by the viewer, the non-polarized light waves are required to be polarized. Polarized light waves are light waves wherein the reflected light waves are in a single plane, namely an operative vertical plane. The process of transforming non-polarized light waves into polarized light waves with the waves oriented in a pre-determined direction is known as polarization. The polarization of light helps reduce glare and enables clear viewing of an image.

There are a variety of methods for polarizing light waves including polarization by transmission, reflection, scattering and refraction of non-polarized light waves. Polarization by refraction is carried out by passing non-polarized light waves from one material to another.

With binoculars different coatings have been applied to lenses to filter the light and reduce glare. These non-glare coatings only filter light and do not actually polarize light.

There have also been a number of attempts to provide binoculars with lenses that polarize light by adding changeable external lenses at the eye piece or objective or by adding a set of polarized glasses. U.S. Pat. No. 2,383,186 describes a polarized lens that pivots about the end of the eye pieces of the binoculars. In contrast, U.S. Pat. No. 3,528,724, U.S. Pat. No. 5,264,916 and U.S. Pat. No. 5,404,225 describes the use of moveable polarized lens in front and away from the array of lens of the binoculars. A different approach was taken in US2007064307 where the coupling of polarized eyeglasses with binoculars was described.

The prior art binoculars suffered problems. The coatings on lens did not provide true polarization of light passing though the lens array. Where the prior art binoculars employed polarized lenses, there were often focus issues.

OBJECT OF THE INVENTION

It is an object of the present invention to provide a viewing apparatus which reduces glare while viewing an object and overcomes one or more of the aforementioned problems.

SUMMARY OF THE INVENTION

The present invention was developed through trial and experimentation. The inventor realized that externally fitted polarized filter lens over the end caps had focal length discontinuity resulting in the view through the lens not being completely polarized and causing the polarized image to be washed out around the edges. Furthermore it was discovered that both the position and the orientation were important to ensure that the lens can filter out horizontal light. The present invention was developed through the realization that it was necessary to fix the polarized lens internally in a correct position and orientation within the optical path of the viewing apparatus.

In one aspect of the present invention, there is a viewing apparatus comprising an eyepiece, a polarized lens, one or more prisms and an objective lens; wherein the polarized lens is fixed between the eyepiece and one of the one or more prisms and said polarized lens is shaped to provide an optically correct image and orientated in the vertical plane to substantially filter horizontal light.

Preferably the viewing apparatus has a polarized lens that is shaped, positioned and orientated to provide a substantially clear polarized image across the entire field of view at all times without requiring any adjustment other than focusing.

Preferably the polarized lens is positioned in a fixed position where the polarized lens does not rotate when focusing the viewing apparatus. The eyepiece comprises one or more ocular lens and can be rotated to focus the refracted image.

The polarized lens is preferably mounted adjacent to the prism.

Preferably the polarized lens is positioned in a mounting frame located between the one or more prisms and the eyepiece. More preferably the mounting frame is adjacent the one or more prisms. The mounting frame more preferably correctly spaces the eyepiece lens from the polarized lens to provide focal alignment.

Preferably the polarized lens has one or more guiding members to guide the positioning of the polarized lens to the correct oriented position. In one form the polarized lens has laser marks indicating the correct orientation of polarized lens.

The polarized lens has one or more guiding members to guide the positioning of the polarized lens to the correct oriented position that can be aligned with corresponding locating members on the mounting frame. In one embodiment the guide members on the polarized lens are protrusions while the locating members are shaped recesses surrounding an aperture on the mounting frame. Alternately the guiding members can be marks on the polarized lens and the locating members can be corresponding marks and aligning the marks brings the polarized lens into the correct alignment.

The viewing apparatus includes any one of binoculars, hunting or sporting scopes and periscopes. In the embodiment where the viewing apparatus is a pair of binoculars, a polarized lens can preferably be used with poro-prism binoculars and roof prism binoculars.

In another aspect, the present invention broadly resides in a viewing apparatus comprising an eyepiece with one or more ocular lenses and a view port, a polarized lens orientated and positioned on a mounting frame, one or more prisms and an objective lens; wherein the polarized lens is fixed between the eyepiece and the one or more prisms and is shaped to provide an optically correct image and orientated in the vertical plane to substantially filter refracted horizontal light.

Preferably the mounting frame is mounted to or associated with the one or more prisms to position the polarized lens adjacent the one or more prisms.

BRIEF DESCRIPTION OF THE DRAWINGS

In order that the present invention can be more readily understood reference will now be made to the accompanying drawings which illustrate a preferred embodiment of the invention and wherein:

FIG. 7 shows an alternate mounting frame for a polarized lens wherein (A), (B), (C), (D) and (E) show a top view, side perspective view, side view, another side view and a bottom view respectively.

DETAILED DESCRIPTION OF THE PREFERRED EMBODIMENT

Figure 1:
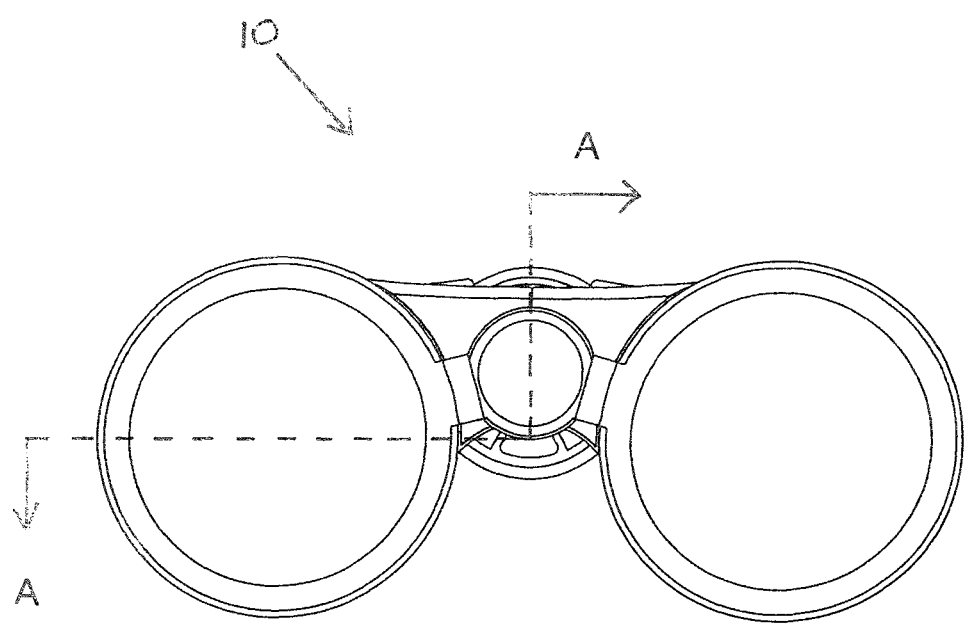
FIG. 1 shows a front diagrammatic view of a pair of binoculars in accordance with the present invention.

A preferred embodiment of the viewing apparatus with an integrated polarized lens, of the present disclosure, will now be described in detail with reference to the accompanying drawings. The preferred embodiment does not limit the scope and ambit of the disclosure and the description provided is by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The following description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present invention envisages a viewing apparatus that aims to overcome the aforementioned drawbacks in the prior art. The polarized lens in the present invention is an internally located lens and aimed at reducing glare and reflections. Because of the location of the polarized lens and the mounting frame, the eye piece consequently extends further than the eye pieces of binoculars known in the art. The positioning of the polarized lens is such that it is optically correct for different viewing conditions. The invention lies in the pre-determined shape, thickness, position and orientation of the polarized lens to provide an optically correct image. No moving parts are involved. The polarized lens is permanently integrated within the binocular viewing plane.

A preferred embodiment will henceforth be described with respect to binoculars. However, the embodiment and the method of placement of lens thereof are applicable to other viewing apparatus including hunting and sporting scopes, telescopes, rifle scopes, microscopes, periscopes and kaleidoscope.

Referring to the accompanying FIGS. 1 to 7, the binoculars with polarized lens, in accordance with this invention is indicated by reference numeral 10.

Figure 2:
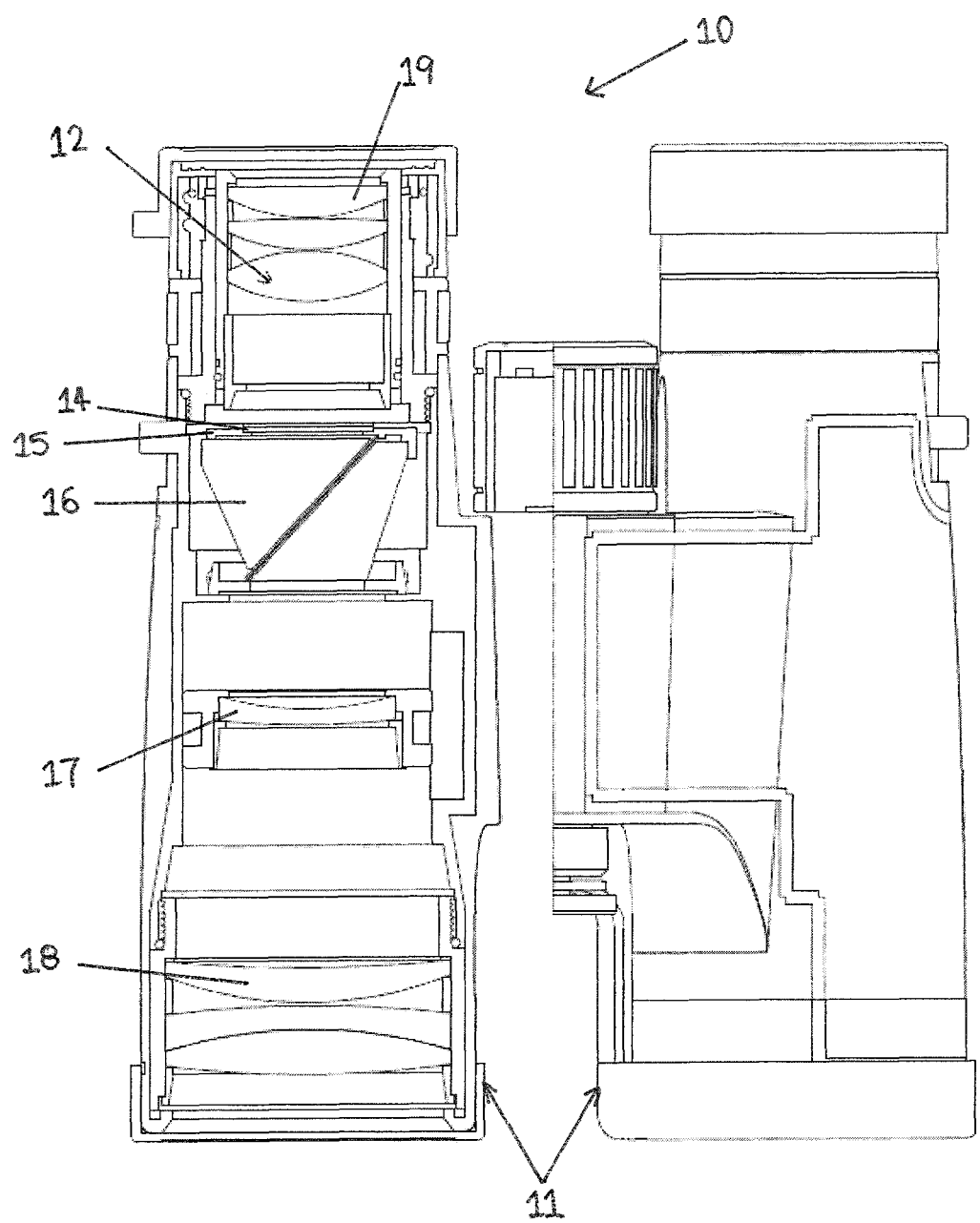
FIG. 2 illustrates a sectional view of the pair of binoculars shown in FIG. 1 along the line A-A.
Figure 3:
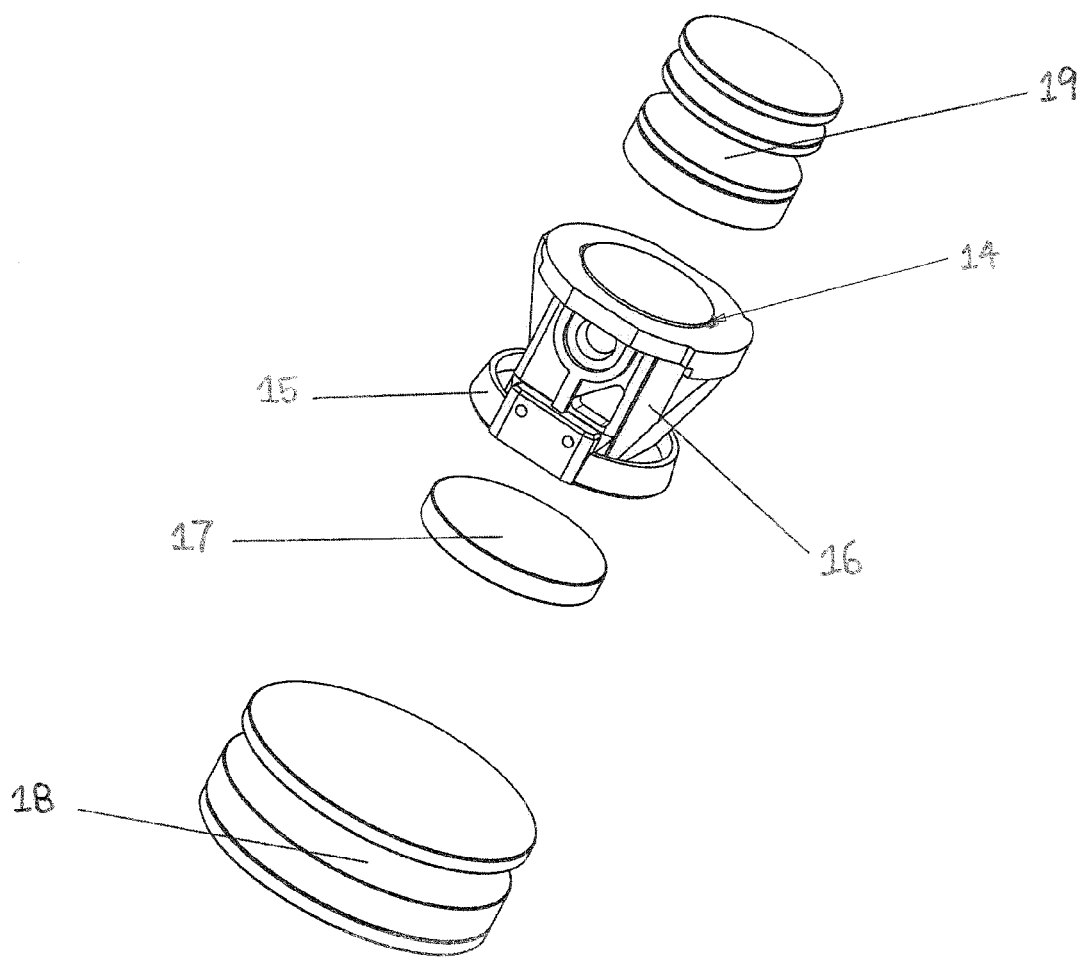
FIG. 3 shows the positioning of the polarized lens with respect to the other lenses in the binoculars shown in FIG. 1.

The binoculars 10 has two viewing tubes 11. Each viewing tube 11 has an eyepiece 12 with several ocular lens 19, a polarized lens 14, mounting frame 15, prisms 16, adjusting lens 17 and an objective lens 18. The binoculars 10 shown in FIGS. 1 and 2 are roof type binoculars with a 10× magnitude and a 42 mm objective lens diameter (hence 10×42).

The objective lens 18 enables non-polarized light waves reflected from a surface or object to pass into the binoculars 10. The image formed by the light waves transmitted by the objective lens 18 is inverted. Light then passes through the prism 16 which re-inverts the image so that it can be viewed in the correct orientation from the eyepiece 12.

The polarized lens 14 is mounted adjacent the prisms 16 in a mounting frame 15 which provides for the correct positioning and orientation of the polarized lens 14. The polarized lens 14 is correctly positioned by the use of orientation protrusions 21 that only allow the polarized lens 14 to be located in one position.

The polarized lens 14 lies in the optical path of the prisms 16 and enables polarization of the non-polarized light waves thereby reducing glare from the non-polarized light waves. The polarized lens 14 is fixed in a pre-determined position so as to provide a clear polarized image across the whole field of view without requiring any adjustment other than focusing.

Figure 4:
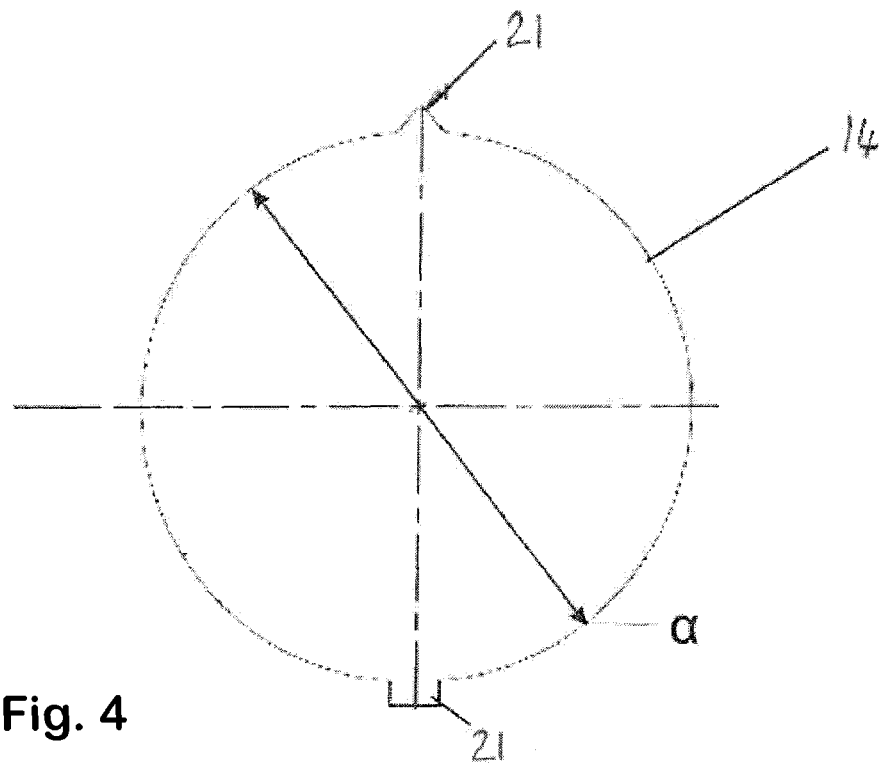
FIG. 4 illustrates a front view of the polarized lens of the binoculars shown in FIG. 1.
Figure 5:
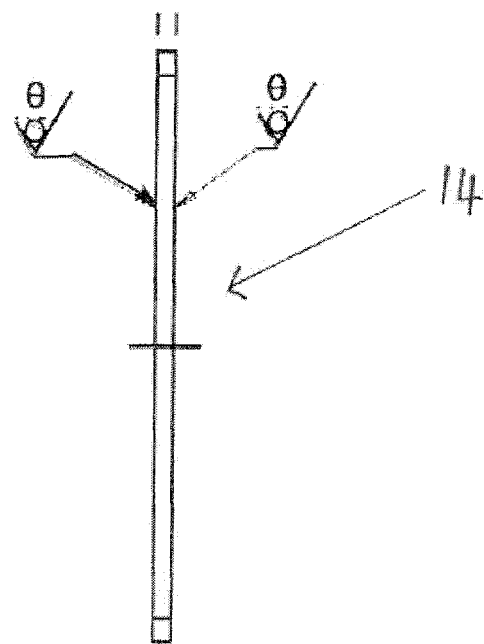
FIG. 5 illustrates a side view of the polarized lens in the binoculars shown in FIG. 1.
Figure 6A:
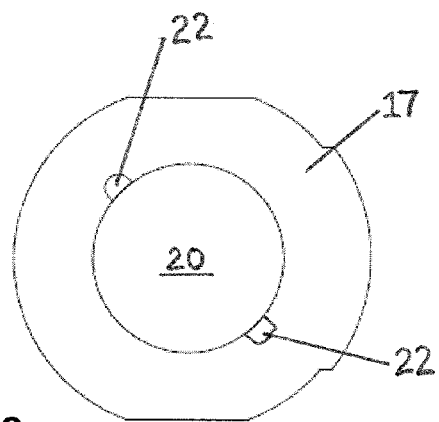
FIG. 6 illustrates the mounting frame for the polarized lens as shown in FIG. 1 wherein (A), (B), (C), (D) and (E) show a top view, side perspective view, side view, another side view and a bottom view respectively.
Figure 6B:
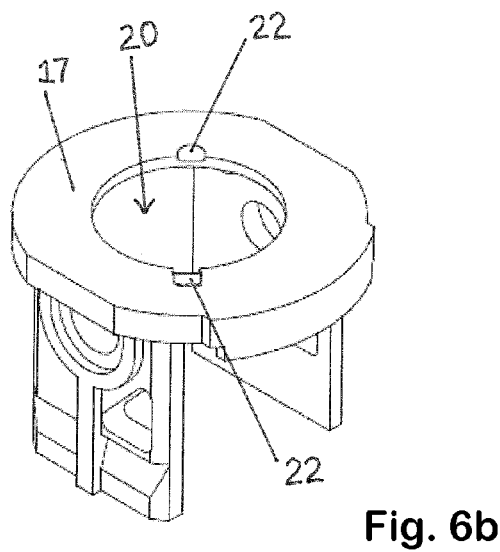
Figure 6C:
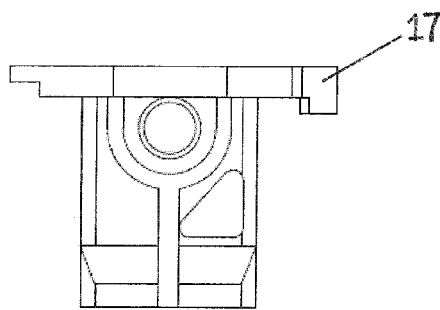
Figure 6D:
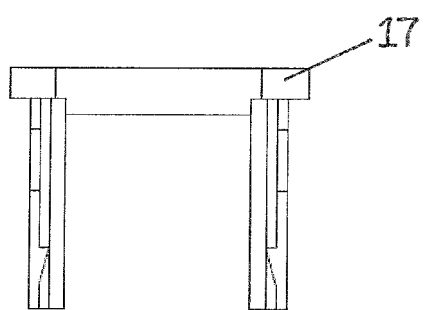
Figure 6E:
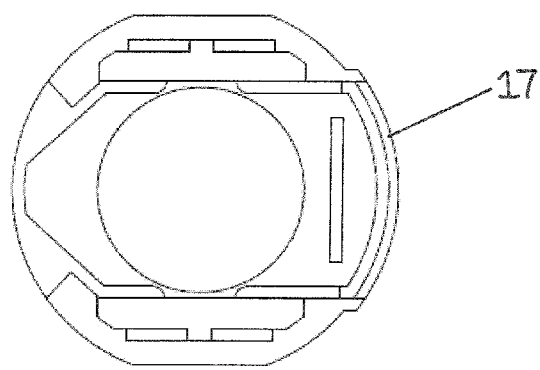

As shown in FIGS. 4 and 5, the polarized lens 14 has a predetermined diameter '$\alpha$' and a curvature angle '$\theta$'. The predetermined shape, thickness, position and orientation are aimed to provide an optically and correctly oriented image by blocking reflected non-polarized light waves and glare in the horizontal plane.

FIG. 6 shows the mounting frame 15 for the roof type binoculars 10 with an aperture 20 on which the polarized lens 14 is positioned in the correct orientation using guides 22. In contrast, a mounting frame 30 is shown in FIG. 7 which can be used for a larger sized poro-type binocular. The mounting frame 30 is suitable for a poro-type binocular 8×56. With the mounting frame 30, the aperture 31 is slightly off-centre to accommodate the different light path in the poro-type binocular. The polarized lens can be positioned over the aperture 31 and correctly orientated aligning the recessed guides 34 with the polarized lens protrusions.

The polarized lens with the appropriate mounting frame can be internally integrated with both roof-type binoculars and poro-type binoculars. The mounting frame provides position, spacing from the prisms and correct orientation to provide optically correct images with polarized light.

The preferred embodiment is directed to a pair of binoculars having an eyepiece with one or more ocular lenses and a view port, a polarized lens orientated and positioned on a mounting frame, one or more prisms and an objective lens; wherein the polarized lens is fixed between the eyepiece and the one or more prisms and is shaped to provide an optically correct image and orientated in the vertical plane to substantially filter refracted horizontal light. The invention has application with hunting or sporting scopes and periscopes and other types of viewing apparatus.

ADVANTAGES

An advantage of the preferred embodiment of the present invention includes providing a pair of binoculars that eliminates glare while at the same time provides an optically correct image substantially in the entire field of view.

The invention can be applied to a variety of viewing apparatus including binoculars, scopes, telescopes and periscopes.

VARIATIONS

It will of course be realized that while the foregoing description has been given by way of illustrative example of this invention, all such and other modifications and variations thereto as would be apparent to persons skilled in the art are deemed to fall within the broad scope and ambit of this invention as is herein set forth. Throughout the description and claims of this specification the word "comprise" and variations of that word such as "comprises" and "comprising", are not intended to exclude other additives, components, integers or steps.

The invention claimed is:

1. A viewing apparatus comprising:
   an eyepiece;
   a polarized lens;
   one or more prisms; and
   an objective lens;
   wherein said polarized lens is shaped to provide an optically correct image and orientated in a vertical plane to substantially filter horizontal light and is fixed between the eyepiece and one of the one or more prisms and in the light path from the one of the one or more prisms;
   said polarized lens is positioned in a mounting frame in a correct placement, alignment and orientation with respect to the shape of the polarized lens to provide an optically correct image with polarized light that passes through the polarized lens; and
   the polarized lens has one or more guiding members to guide the positioning of the polarized lens to the correct oriented position that can be aligned with corresponding locating members on the mounting frame.

2. The viewing apparatus as claimed in claim 1, wherein the polarized lens is positioned in a fixed position where the polarized lens does not rotate when focusing the viewing apparatus.

3. The viewing apparatus as claimed in claim 1, wherein the polarized lens is mounted adjacent to the one of the one or more prisms.

4. The viewing apparatus as claimed in claim 1, wherein the mounting frame correctly spaces the eyepiece lens from the polarized lens to provide focal alignment.

5. The viewing apparatus as claimed in claim 1, wherein the polarized lens is mounted adjacent to the one of the one or more prisms and the mounting frame correctly spaces the eyepiece lens from the polarized lens to provide focal alignment.

6. The viewing apparatus as claimed in claim 1, wherein the mounting frame is adjacent the one or more prisms.

7. The viewing apparatus as claimed in claim 1, wherein the polarized lens is mounted adjacent to the one of the one or more prisms and the mounting frame is adjacent the one or more prisms, and
   the mounting frame correctly spaces the eyepiece lens from the polarized lens to provide focal alignment.

8. The viewing apparatus as claimed in claim 1, wherein the guiding members on the polarized lens are protrusions while the locating members are shaped recesses surrounding an aperture on the mounting frame.

9. The viewing apparatus as claimed in claim 1, wherein the guiding members are marks on the polarized lens and the locating members are corresponding marks and alignment of the marks brings the polarized lens into the correct orientation.

10. The viewing apparatus as claimed in claim 1, wherein the viewing apparatus includes any one of binoculars, hunting or sporting scopes and periscopes.

11. The viewing apparatus as claimed in claim 1, wherein the viewing apparatus is Porro prism binoculars or roof prism binoculars.

* * * * *